United States Patent
Waddell et al.

[11] Patent Number: 5,834,693
[45] Date of Patent: Nov. 10, 1998

[54] COMPUTER I/O SUPPORT BRACKET AND CABLE ASSEMBLY

[75] Inventors: M. Eugene Waddell, Woodruff; Douglas E. Piper, Greenville, both of S.C.

[73] Assignee: Woven Electronics Corporation, Simpsonville, S.C.

[21] Appl. No.: 848,048

[22] Filed: Apr. 28, 1997

Related U.S. Application Data

[63] Continuation of Ser. No. 405,753, Mar. 20, 1995, abandoned.

[51] Int. Cl.⁶ ..................................................... H02G 3/18
[52] U.S. Cl. .................................. 174/65 R; 174/35 GC; 248/68.1; 248/56; 361/686; 361/827; 439/94; 439/98
[58] Field of Search ............................. 174/65 R, 35 R, 174/35 GC, 68.1, 151, 154, 153 G, 250, 135; 248/68.1, 56, 49, 74.4, 316.37; 307/147; 361/816, 817, 818, 825, 826, 827, 829, 683, 686; 439/92, 94, 98

[56] References Cited

U.S. PATENT DOCUMENTS

| | | | |
|---|---|---|---|
| 3,002,047 | 4/1961 | Mannella | 174/35 R X |
| 3,123,662 | 3/1964 | Fink | 248/56 X |
| 3,830,954 | 8/1974 | Caudill | 248/68.1 X |
| 4,262,166 | 4/1981 | Radzishevsky et al. | 174/65 R |
| 4,325,103 | 4/1982 | Ito et al. | 174/35 R X |
| 4,419,535 | 12/1983 | O'Hara | 174/48 |
| 4,431,861 | 2/1984 | Clabburn et al. | 174/DIG. 8 X |
| 4,627,673 | 12/1986 | Barrus, Jr. | 439/92 |
| 4,771,136 | 9/1988 | Grover et al. | 174/65 R X |
| 4,775,121 | 10/1988 | Carty | 248/68.1 |
| 4,855,533 | 8/1989 | Meyer Swantee | 174/35 R |
| 4,873,395 | 10/1989 | Mast | 174/35 GC |
| 4,884,774 | 12/1989 | Rodi et al. | 248/56 |
| 5,099,137 | 3/1992 | Lattin, Jr. | 307/147 |

(List continued on next page.)

FOREIGN PATENT DOCUMENTS

| | | | |
|---|---|---|---|
| 0 618 656 A1 | 2/1994 | Germany | H02G 3/22 |
| 2308600 | 12/1990 | Japan | 361/818 X |
| 470637 | 8/1937 | United Kingdom . | |
| 544618 | 4/1942 | United Kingdom . | |
| 2 260 660 | 4/1993 | United Kingdom | H01R 4/64 |

*Primary Examiner*—Dean A. Reichard
*Attorney, Agent, or Firm*—Henry S. Jaudon; Cort Flint

[57] ABSTRACT

The support bracket and cable assembly of this invention allows an internal circuit board of a host computer to be directly connected to a plurality of peripheral devices using a plurality of interface cables through a first port of an input/output frame. A rigid compound bracket has two bracket elements with cutouts to form cylindrical openings through which the interface cables pass. The cylindrical openings or channels have at least one collar that grips and holds the interface cables within a single port of an input/output (I/O) frame of an enclosure of the host computer. Therefore, interface cables to go directly from the internal circuit board to the peripheral devices without intermediate connectors at the I/O frame. The compound bracket is attached to the I/O frame by a bracket mount arrangement. A grounding interface is provided for the peripheral devices as the interface cables pass through the cylindrical openings in the compound bracket. This allows for electromagnetic interference (EMI) shielding and grounding of the cable/bracket assembly to the host computer. An unshielded length of each interface cable extends from the compound bracket to the first electrical connector at a circuit board within the host computer. A shrink tubing is applied to the unshielded length to provide insulation for this length. The compound bracket may be a segmented bracket to allow a lesser number of interface cables through the single port than the maximum number possible.

14 Claims, 5 Drawing Sheets

U.S. PATENT DOCUMENTS

| | | | |
|---|---|---|---|
| 5,122,068 | 6/1992 | Koss | 439/98 |
| 5,170,017 | 12/1992 | Stanevich et al. | 174/151 X |
| 5,202,538 | 4/1993 | Skirpan | 361/827 X |
| 5,205,751 | 4/1993 | Schwartz et al. | 174/35 GC X |
| 5,218,760 | 6/1993 | Colton et al. | 439/92 X |
| 5,233,692 | 8/1993 | Gajjar | 395/325 |
| 5,239,133 | 8/1993 | Beck et al. | 174/65 R |
| 5,241,136 | 8/1993 | Michaelis et al. | 174/151 |
| 5,266,036 | 11/1993 | Lichtenwalter et al. | 174/35 GC X |
| 5,311,408 | 5/1994 | Ferchau et al. | 361/818 |
| 5,323,299 | 6/1994 | Weber | 361/818 |
| 5,353,202 | 10/1994 | Ansell et al. | 361/818 |
| 5,377,939 | 1/1995 | Kirma | 248/68.1 |
| 5,416,668 | 5/1995 | Benzoni | 361/816 |
| 5,504,659 | 4/1996 | Acatay et al. | 361/816 |

COMPUTER I/O SUPPORT BRACKET AND CABLE ASSEMBLY

This application is a continuation of application Ser. No. 08/405,753 filed on Mar. 20, 1995, now abandoned.

BACKGROUND OF THE INVENTION

This invention relates to computers, and more particularly to the multiconductor interface between a host computer and multiple peripheral devices. The direct connection of the host computer is made through a single port of the ports of an input/output (I/O) frame using a support bracket and cable assembly.

The ability to connect a number of peripheral devices to a single computer is limited by the number of connective pathways through which the input and output signals can pass between components housed within an enclosure of the host computer and those external to the enclosure. Each conductive pathway is realized by an interface cable having a plurality of conductors. The connective pathway starts at a connector device within the enclosure that is attached to a printed circuit board being linked through a mother board or system to a system processor that provides computing capability to a single user. Printed circuit boards are well known in the art and described in various technical publications. The connective pathway ends with another connector device attached to the peripheral device being driven by the host computer. Peripheral devices include CD/ROM devices, multiple diskette drives, external storage devices and the like.

The conductive pathway is classicly interrupted by an additional male-female pair of connectors at a port of the I/O frame positioned at an outer surface of the enclosure. These male-female connectors are much larger than the cross-sectional area of the cable itself. This results in a space limitation within the ports of the I/O frame of the host computer; as there are only a limited number of ports having a limited total area. This total port area must also be shared with additional interface cables to standard components of the system including printers, a keyboard, mouse devices and the like. The need is to be able to run the interface cables to numerous peripheral devices directly through one port of the ports of the I/O frame. However, this need is coupled with the need to shield, support and hold the interface cables as well as to provide a ground for each peripheral device as the cables exit the enclosure.

A number of clamp and bracket devices exist for holding electrical cables as they penetrate an enclosure, a surface or a wall. Other similar clamp and bracket devices are used to support a number of electrical cables parallel to a surface. Such clamp and bracket devices are disclosed in U.S. Pat. Nos. 4,262,166; 4,775,121; 5,241,136; and 5,377,939. In U.S. Pat. No. 4,262,166 a number of bunched connectors are sealed as they penetrate a wall. A square resilient sleeve is placed around each conductor to allow them to be compressed together to provide a sealing arrangement. The bunch is held together by a retainer means and a flange on one end is inserted in the wall to conform to an opening in the wall. There is no need to provide a grounding means for this application.

The disclosure of U.S. Pat. No. 4,775,121 describes a surface mounted cable clamp attaching a number of parallel cables to a wall. Small recesses at the top and bottom of the plastic clamp enable the installer to snap this plastic clamp into place on the wall. Cables are placed into a plurality of fingers forming cylindrically shaped openings on the plastic clamp and a retaining arm holds the cables within the clamp. There is no requirement to ground the cables to the wall in using this clamp device.

The cable attachment adapter unit of U.S. Pat. No. 5,241,136 is for a circuit breaker or electrical switch enclosure. This molded plastic support adapter unit has a plurality of knock-outs within a unit base to allow for passage of electrical distribution cables. Each opening has a side extension and a u-shaped clamp to secure the cable in the knock-out opening. Once again, the grounding of electrical cables is not provided or desirable and a tight fit in the opening of the panel board is not required for shielding. A similar device for mounting wiring in an aircraft is disclosed in U.S. Pat. No. 5,377,939. Two neighboring mounting sections are used to insure proper clamping of elongated elements, including electrical wiring components. Channel surfaces are provided with at least one projection that engages the respective component. Channels can be arranged in rows between at least two mounting sections. This device does not require grounding of the electrical wires and the opening is not shielded.

Grounding and shielding of the I/O signals of electrical pathways is discussed in U.S. Pat. Nos. 5,311,408; 5,323,299; and 5,353,202. A grounding structure grounds the computer system including the peripheral components to the enclosure where a shielding structure attenuates the effects of electromagnetic interference (EMI) on I/O circuits of the computer system. It is well known that a computer housed within an enclosure and supported by the enclosure are capable of emitting electromatic radiation. Standards have been established for limiting such emissions. Openings provided in an enclosure can present particularly difficult problems in shielding. Grounding and shielding are interrelated as efforts to bring emissions within the required standards have resulted in designs to completely ground the enclosure with minimum gaps and openings to the exterior.

In U.S. Pat. No. 5,311,408 an electronic module (connector) is mounted to a backplane which has a conductive pin extending to a grounding clip within the enclosure. A conductive gasket also mechanically and electrically couples the enclosure to the backplate. This allows the enclosure and a ground plate of the backplate to be grounded at the time of the electrical connection between the interface connectors. This electronic assembly again has a male-female pair of intermediate connectors in the conductive pathway from the circuit board to the peripheral device.

A complete internal shield apparatus is used in U.S. Pat. No. 5,323,299 to prevent EMI signals from reaching electronic circuitry within the enclosure. The EMI is kept from the susceptible electronic circuits by a positive shield. As EMI signals reach the EMI shield they are absorbed and conducted to an electrical ground. The importance of a good electrical ground is once again related to solving the problems associated with EMI shielding.

The particular problem of shielding I/O signals is discussed in more detail in U.S. Pat. No. 5,353,202. A shielding structure in the form of a thin sheet metal with particularly formed ground plate areas on the circuit board is provided for the area through which such I/O signals pass. Once again an intermediate connector establishes the connection between an external peripheral device and the circuit board of the host computer in the conductive pathway. As disclosed in this patent, intermediate connectors provide a potential point for either emissions of EMI or impingement of such interference on the I/O circuits passing through this intermediate region.

The design of a Small Computer System Interface (SCSI) bus for providing conductive pathways between a host computer and one or more peripheral devices is known in the art. The SCSI bus technology does permit conductive pathways to exist to communicate with a number of peripheral devices through a relatively small port area in the I/O frame of the enclosure. This interface technology is discussed in U.S. Pat. Nos. 5,099,137 and 5,233,692. The SCSI provides a bite-wide data bus to control data transfers between peripheral devices and a host computer, among peripheral devices and among multiple host systems. Each host system has a host adapter to request an I/O process to be performed by a target device. The logic used to differentiate between control and data information and to selectively communicate with a certain peripheral device is disclosed in detail in U.S. Pat. No. 5,233,692. The SCSI bus does not solve the problem of space for connectors at the ports of the I/O frame. In fact, the SCSI bus technology uses intermediate connectors as required by other conductive pathway systems. The need remains to always limit the port area used by each conductive pathway comprising a cable with multiple conductors.

Accordingly, an object of the present invention is to provide conductive pathways for data transfer using electrical cables with multiple conductors and connectors which directly connect a printed circuit board within a host computer to associated peripherals external to the host computer.

Another object of the present invention is to provide a support bracket to allow sheathed cables to pass through a single port of a I/O frame of the computer, including means for securing and holding the cables.

Yet another object of the present invention is to allow interface cables as data transmission lines to pass through a port of the I/O frame of a computer while maintaining EMI shielding to separate certain electronic circuits from other electronic circuits and interference, while permitting desired I/O signals (data) through the transmission lines and while maintaining a common ground for the networked system.

A further object of the present invention is to economically provide a compound support bracket which has the interface cables easily, quickly and securely attached to it and placed within one port of the ports of an I/O frame of a host computer's enclosure.

SUMMARY OF THE INVENTION

The above objectives are accomplished according to the present invention by providing a cable/bracket assembly for connecting an internal circuit board of a host computer to a plurality of external peripheral devices. The computer has an enclosure with a plurality of ports defined by an input/output (I/O) frame which includes a plurality of spaced apart side posts, an upper rail and a lower rail. The cable/bracket assembly comprises a plurality of electrical interface cables having a first end and a second end, a plurality of first electrical connectors carried by the first ends of the cables for connecting the cables to the internal circuit board and a plurality of second electrical connectors carried by the second ends of cables for connecting the cables to respective ones of the peripheral devices. The cable/bracket assembly also comprises a compound bracket for holding and routing the plurality of cables through a first one of the ports of the I/O frame of the host computer. The assembly further includes a bracket mount for attaching the compound bracket to the host computer in a closure position closing the first port with the cables passing through the compound bracket for connecting the internal circuit board with the external peripheral devices.

The above objectives are also accomplished according to the present invention by a method for producing a cable/bracket assembly for connecting an internal circuit board of a host computer to a plurality of external peripheral devices. The computer has an enclosure with a plurality of ports defined by an input/output (I/O) frame which includes a plurality of spaced apart side posts, an upper rail and a lower rail. The method comprises a first step of providing a plurality of electrical interface cables having a plurality of first electrical connectors carried by first ends of the interface cables and a plurality of second electrical connectors carried by second ends of the interface cables. In a second step a compound bracket is provided having first and second bracket elements which hold the plurality of interface cables enroute from the first electrical connector to the second electrical connector through one of the ports of the host computer. The method further comprises a third step of creating grounding interfaces over a preselected length of the interface cables which grounds a shielded portion of the interface cables to the compound bracket. A fourth step comprises clamping the first and second bracket elements together about the grounding interfaces of the interface cables, wherein the shielded portion of each interface cable is grounded to the compound bracket.

The above objectives are further accomplished according to the present invention by a compound bracket for supporting and holding a plurality of cables of a cable assembly passing through a single port defined by an input/output (I/O) frame of a host computer. The I/O frame has spaced apart side posts, an upper rail and a lower rail. The compound bracket comprises a pair of bracket elements being a first bracket element and a second bracket element. The first and second bracket elements are rigidly attached to one another to form a plurality of spaced apart and cylindrically shaped openings to support and hold the plurality of cables as they pass through the plurality of openings. The compound bracket has a lower interface surface in connected contact with the lower rail of the I/O frame and an upper interface surface in connected contact with the upper rail of the I/O frame. The lower and upper rails rigidly attaching and grounding said compound bracket of the cable assembly to the host computer.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENTS

Referring now to the drawings, the invention will now be described in more detail. The invention overcomes the basic problem associated with connecting a number of peripheral devices without using relatively large elements of the available port area of all the ports in the I/O frame of a host computer. The invention eliminates the need for intermediate connectors in interface cables going from a connecting circuit board within the host computer to connectors of peripheral devices. The invention further includes the necessary components for EMI shielding and grounding of the total interconnected system.

Figure 1:
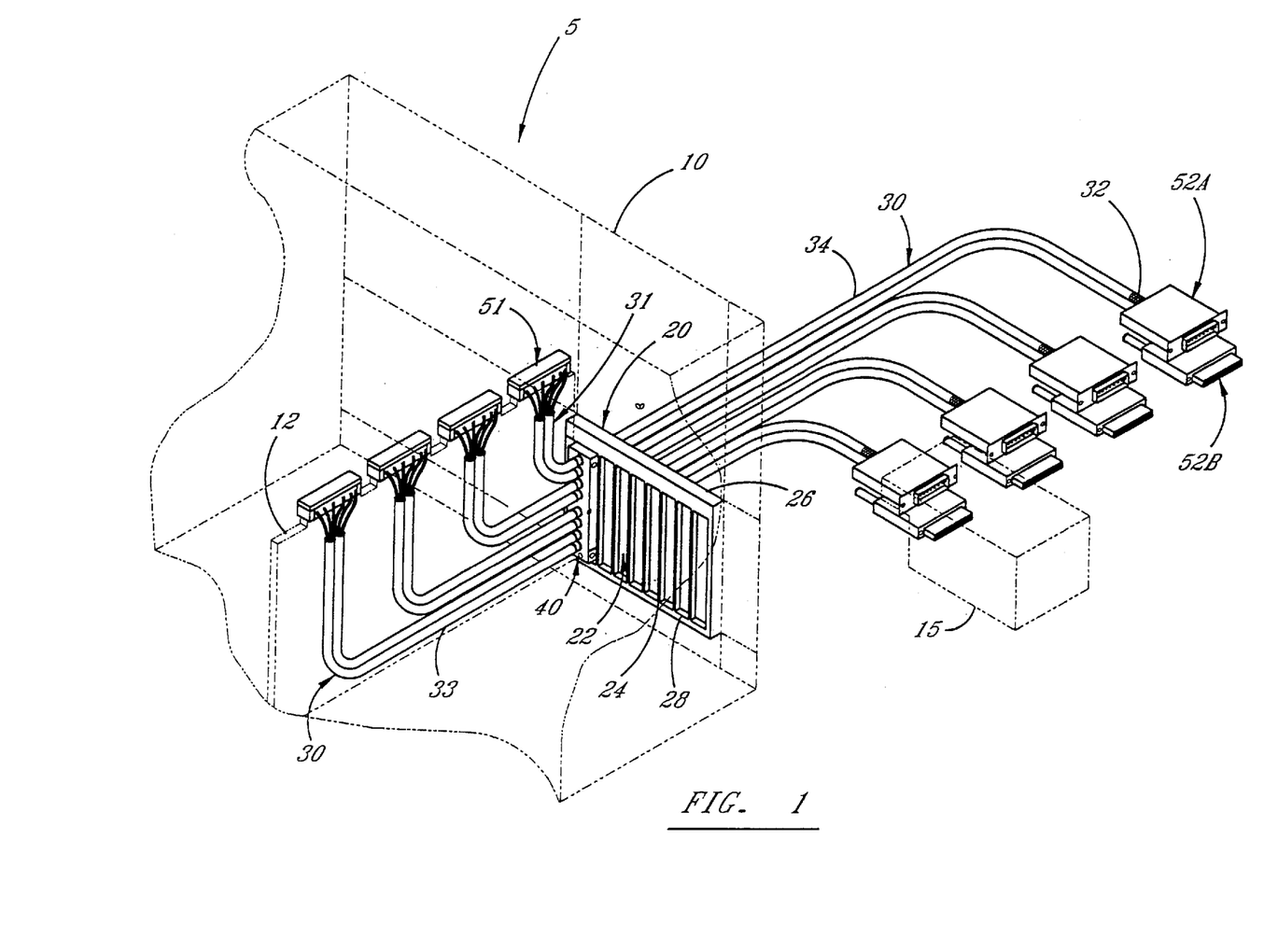
FIG. 1 is a perspective view of the cable assembly of this invention connecting a host computer to at least one peripheral device by way of a compound bracket in the I/O frame.

A complete cable assembly is illustrated in FIG. 1. Interface cables 30 extend from a first end connector 51 to either one of a pair of second end connectors 52A or 52B. The first end connector 51, being attached to a first end 31 of two interface cables 30, is connected to a circuit board 12 within an enclosure 10 of the host computer 5. The preferred first end connector 51 is a 68 position high density female connector. A typical first end connector is part no. RPS-D68FBG1 manufactured by Honda/Motronics of Japan. Each interface cable 30 has an unshielded cable element 33 extending from the first end 31 to a compound bracket 40 in one port 22 of the ports 22 of a I/O frame 20 of the enclosure 10. This unshielded cable element 33 has had its metallic shielding layers removed and a shrink tubing layer has been added. This cable section is to be discussed in more detail in later sections of this disclosure.

Interface cables 30 also extend from the compound bracket 40 to a second end 32 of the interface cable at one of either second end connectors 52A or 52B. Interface cables contain multiple conductors (i.e., 34 pair) which are not interrupted at the compound bracket 40. Two different second end connectors 52A and 52B are shown to illustrate female connectors 52A and male connectors 52B. However, a single connector can be used as permitted by the peripheral device. The preferred second end connectors are typical female connectors 52A (catalog no. 749877-7) and typical male connectors 52B (catalog no. 749621-7) as manufactured by The AMP Corporation of Harrisburg, Pa. This element of the interface cable, being external to the enclosure 10, is preferably a double shielded cable having a woven metallic layer over a metal foil layer and covered with a outer layer at the exterior surface of the cable. A preferred exterior interface cable 34 is a thirty-four pair small computer system interface (SCSI) cable shielded with an inner and outer jacket and having American Wire Gage (AWG) #30 wires as manufactured by Madison Wire and Cable of Worcester, Mass. A typical interior interface cable 33 is the same cable with the shielding layers and the outer layer being removed.

Figure 2:
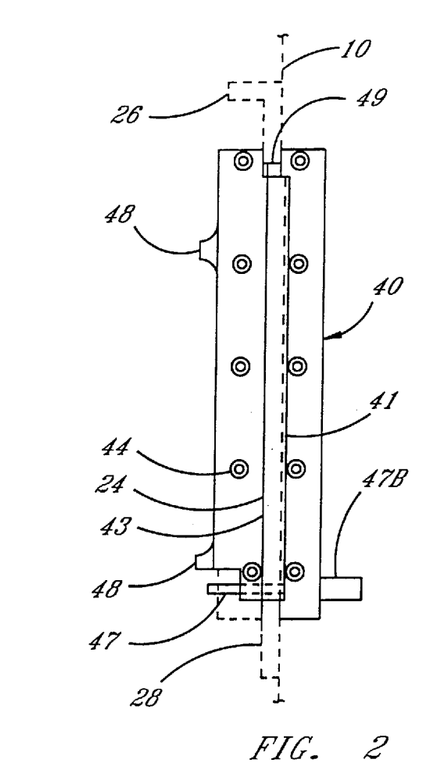
FIG. 2 is a left side elevation view of the compound bracket of this invention.
Figure 3:
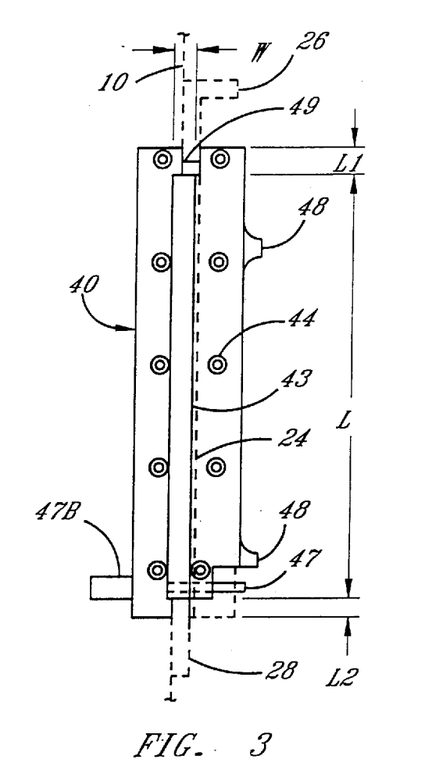
FIG. 3 is a right side elevation view of the compound bracket of this invention.
Figure 4:
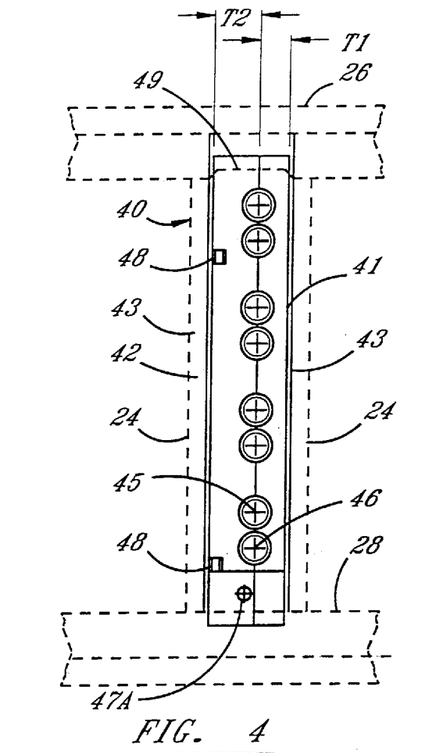
FIG. 4 is a rear elevation view of the compound bracket of this invention.

The penetration of the interface cables 30 from within the enclosure 10 to the exterior is realized within a single port of the ports 22 of the I/O frame 20 of the enclosure 10. This is made possible by providing a compound bracket 40, as illustrated in FIGS. 2, 3 and 4. The compound bracket is illustrated as being in a vertically elongated position to conform to the orientation of the ports of the I/O frame as shown in FIG. 1. The ports 22 are separated by spaced apart posts 24 of the I/O frame 20. A top rail 26 and a bottom rail 28 form the top and bottom bounds of the ports. The compound bracket 40 has a first bracket element 41 and a second bracket element 42. The view illustrated in FIG. 4 is from the rear of the compound bracket and illustrates how the two elements 41 and 42 are interfaced. There are partial cylindrically shaped cutouts in each element that combine to make a plurality of vertically spaced and cylindrically shaped openings 45 for the penetrating interface cables. The first cutouts in the first bracket element 41 can be smaller or larger than half of the total opening volume as long as the second cutouts of the second bracket element 42 combine with the first cutouts to form cylindrical openings 45. A collar 46 in each opening helps hold the individual interface cables. The two elements 41 and 42 are held together by a plurality of fasteners 44 after the cables have been placed in the cylindrically shaped openings 45. A pair of circuit board clips 48, extending to the inside of the second bracket element 42, are provided to help support the circuit board 12 within the host computer. The relative thickness of the two bracket elements are such that the interface cables penetrate the port at an offset. This offset allows the interface cables to be adjacent to but offset from the circuit board 12, but in a position to not interfere with another circuit board serving an adjacent port. The thickness T1 of the first bracket element 41 is in a range of values of about 55 percent to about 70 percent of the thickness T2 of the second bracket element 42.

The two elements of the compound bracket are made from the same material. The material used must provide a mounting of the bracket to give adequate strength in supporting and holding the interface cables in one port of the ports of the I/O frame of the enclosure. The bracket mount must also fill the port and provide shielding against electromagnetic interference (EMI) as well as provide grounding of the bracket to the I/O frame. The compound bracket can be made of a metallic material such as aluminum, steel or the like. The compound bracket is preferably made of a an epoxy material that can be cast and machined prior to receiving a plating of nickel over a copper flash to a plating thickness of about 1 mil (0.001 inch) to about 2 mils. This process makes the compound bracket light in weight, electrically conductive and economical to manufacture.

The compound bracket is attached to the host computer by what is termed herein as a bracket mount. A pair of grounding surfaces on the compound bracket 40 make contact with the I/O frame 20 to hold the assembled compound bracket within a single port of the ports of the I/O frame. An upper interface surface 49 is part of a cutout that engages the upper rail 26 of the I/O frame. A lower interface surface 47 is held in contact with the lower rail 28 of the I/O frame by a screw fastener 47B placed in an opening 47A in the second bracket element 42. Other means to provide grounding surfaces by having the compound bracket interface the I/O frame are within the scope of this invention. The bracket mount must be such that EMI sealing of the port is provided. A conductive gasket 43 on both lateral sides of the assembled compound bracket 40 provides an EMI shield, as well as helping to ground the compound bracket to the I/O frame. Each gasket has a shape and flexibility to be compressed when forced in contact with the side posts 24 of the I/O frame. The length L and width W of the conductive gasket 43 should conform to the size of the port opening as it relates to the size of the compound bracket. The upper interface distance L1 and the lower interface distance L2 should also conform to the size of the I/O frame. Preferably, the conductive gasket 43 is made to be an electromagnetic and/or radio frequency interference (EMI/RFI) shielding gasket known in the art to be both a flexible sealing material for the joint and to be conductive of electrical currents. Gaskets of this type are commercially available from various suppliers, such as the Schlegel Corporation of Rochester, N.Y. The conductive gaskets 43 are attached to the compound bracket within a shallow channel on each lateral side of the compound bracket, using a conductive adhesive typical in the industry.

Figure 5:
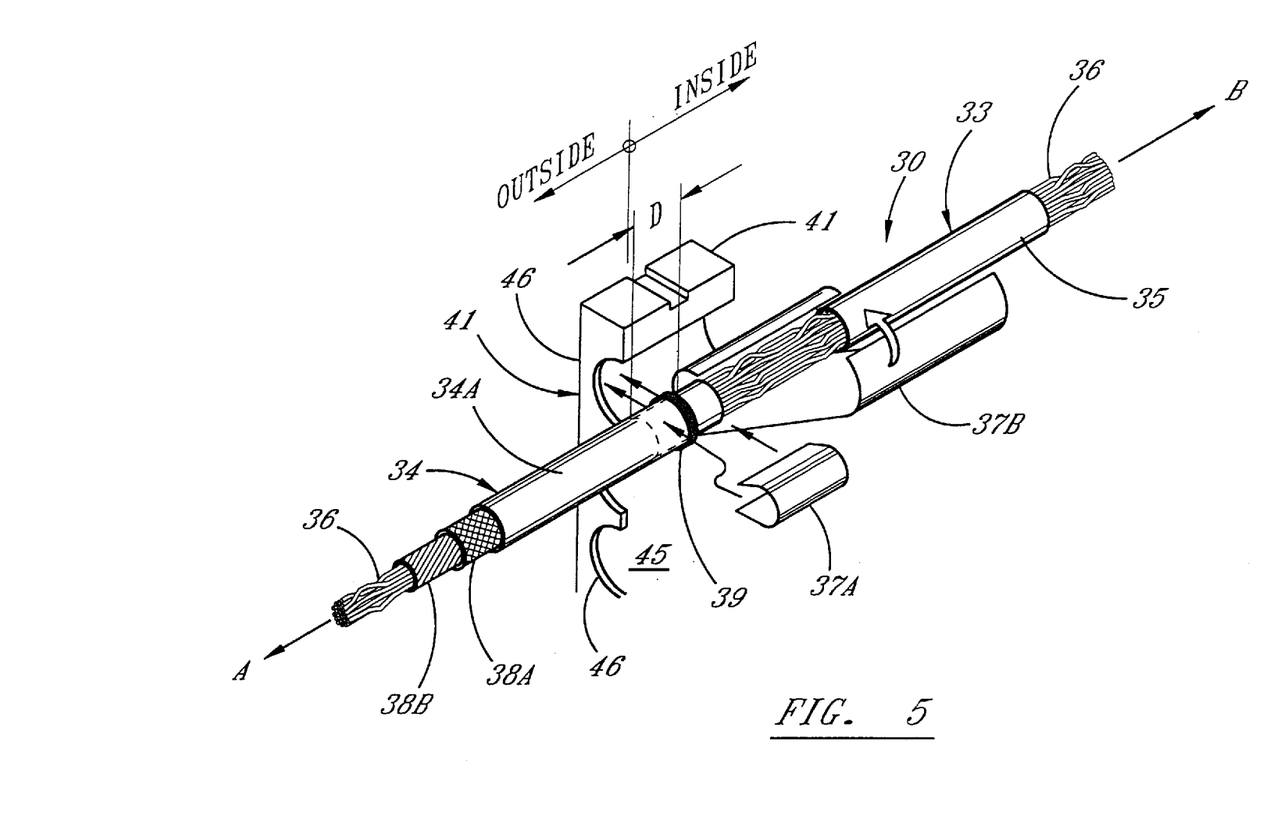
FIG. 5 is an exploded perspective view of an interface cable showing the components of the cable of this invention and their placement as the cable is held by the compound bracket.

The compound bracket of this invention supports, holds and grounds a plurality of interface cables. These functions require a modifications in the interface cables 30 as they pass through the compound bracket as illustrated in FIG. 5. Each of the interface cable elements to the outside of the enclosure 10 is a shielded cable element 34 having a metallic shield layer 38A over a metal foil layer 38B and covered with a plastic outer layer 34A. These three layers are removed inside the enclosure after the interface cable passes through the compound bracket, being discontinued at an intermediate point 39 within the compound bracket. Only a part of the first bracket element is shown in the illustration of FIG. 5; and the second bracket element has been removed to show details of the cable. The metallic shield layer 38A is folded back over the plastic cover layer 34A at the intermediate point 39 of the interface cable. A metallic ferrule 37A is placed radially inside of the end of the metallic shield layer. The ferrule is preferably made from a CAD 110 copper material (half hard) which is nickel plated and 10 mils thick. The ferrule extends axially a distance D under the metallic shield layer 38A and is radially outside the metal foil layer 38B, where distance D is preferably 0.25 inch. A plastic tape 37B is wrapped around the ferrule and covers the exposed multiple conductors 36. This plastic tape 37B is preferably made from a polyurethane elastomer having an adhesive back and is standard in the industry. The folded section of the shield layer 38A at intermediate point 39 is positioned inside of a collar 46 on the compound bracket; when the cable is placed within a cutout 45 of the bracket as shown by the arrows in FIG. 5. The complete circular collar holds the cable from being pulled from the compound bracket when the first and second bracket elements have been connected to each other, as shown in FIG. 4. The metallic shield layer 38A and the ferrule 37A make contact with the compound bracket to provide an electrical ground for peripheral devices connected to this metallic shield layer. Peripheral devices are located in the direction shown by the arrow A of FIG. 5.

Each of the interface cable elements inside the enclosure 10 are unshielded cable elements 33 of the cable assembly. The metallic shield layer 38A the metal foil layer 38B and the outer layer 34A have been removed on this inside element of the interface cables resulting in the cables being unshielded. The outer plastic layer must be replaced to properly protect the multiple conductors 36 from damage. This is accomplished with a shrink tubing 35 placed over the multiple conductors and made to adhere to the conductor bundle by externally heating the shrink tubing. The shrink tubing has an adhesive innerliner. The shrink tubing 35 is preferably made using a flexible polyolefin material that shrinks with increased temperatures, and is well known in the art. The shrink tubing is made to be stable from −55° C. to +125° C. One supplier for shrink tubing is Sumitomo of Freemont, Calif. The plastic tape 37B closes the gap between the ferrule and the shrink tubing 35 to completely insulate the multiple conductors 36 of the unshielded cable element as they extend to the first end 31 at the circuit board 12 in the direction shown by arrow B of FIG. 5.

Figure 6:
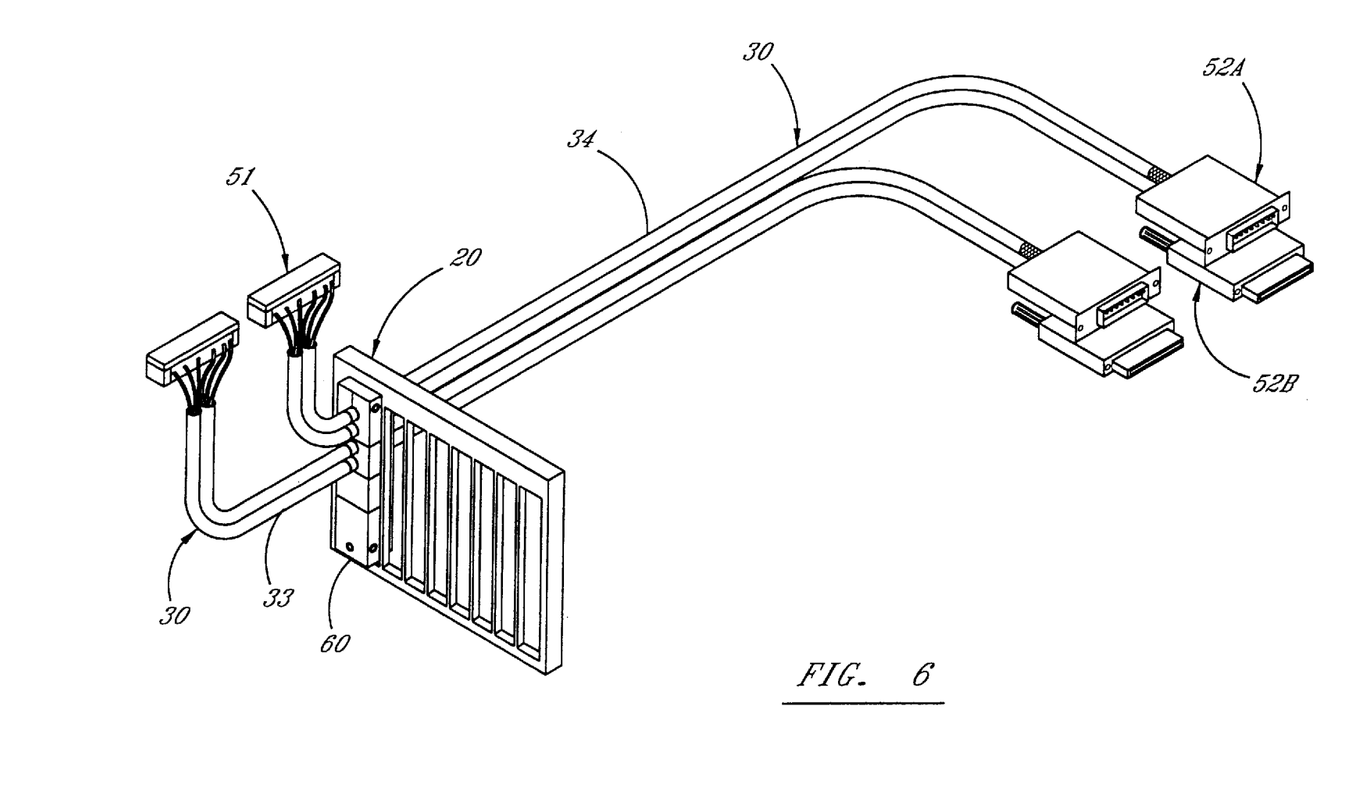
FIG. 6 is a perspective view of a partial cable assembly of this invention as it penetrates a segmented bracket in the I/O frame.

The cable assembly of this invention is also used when only a limited number of interface cables is necessary, as illustrated in FIG. 6. Only four interface cables 30 are shown to penetrate the I/O frame 20 in this example. This mode of operation requires a modification of the compound bracket to include the embodiment of a segmented bracket 60. The four cables are shown to penetrate the top four positions of the segmented bracket, however, any four positions of an eight position compound bracket as illustrated may be used as desired. Preferably, the positions are selected in pairs so the design of a segmented bracket can be realized. The idea is to have blank segments and segments which have a pair of cylindrical openings.

Figure 7:
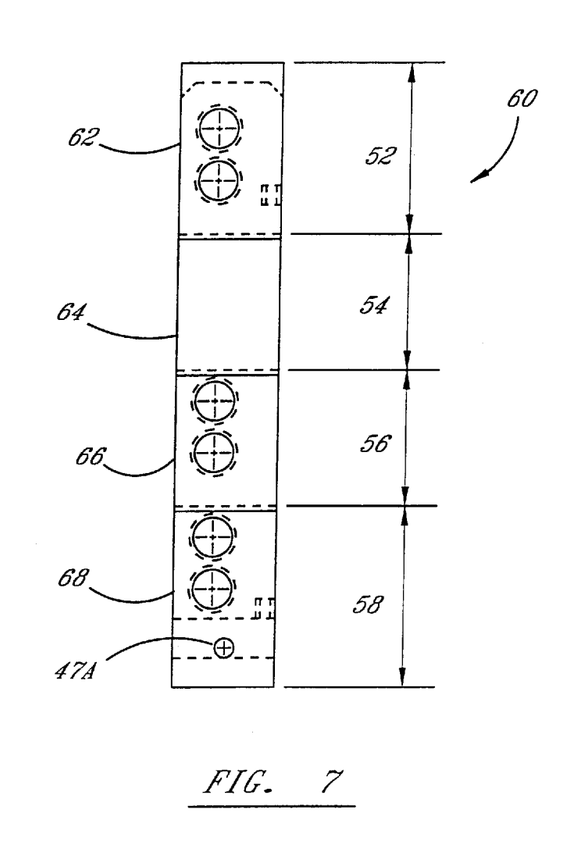
FIG. 7 is a front elevation view of the segmented bracket being another embodiment of this invention.
Figure 8:
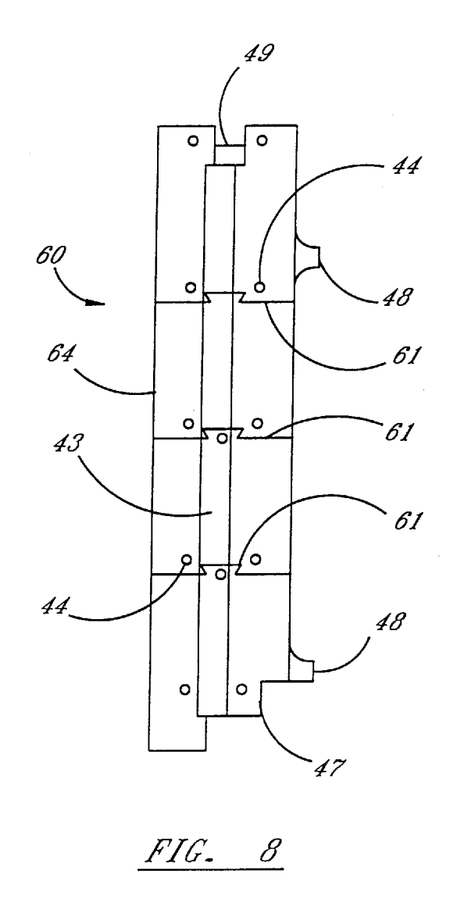
FIG. 8 is a left side elevation view of the segmented bracket of this invention.

An example of a segmented bracket is illustrated in FIGS. 7 and 8. In this example six cylindrical openings are provided so that six interface cables 30 can penetrate one port 22 of the ports of the I/O frame 20 of the enclosure 10 of the host computer 5 (see FIG. 1). The segmented bracket 60 is realized by providing three wedge shaped cuts 61 laterally across the compound bracket 40. The plurality of fasteners 44 have been relocated to connect each segment individually. The segments 62,64,66,68 slide together to form a compound bracket having the same shape as before. An indentation and a bump can be provided in respective adjacent segments along the interfaces formed by the wedge shaped cuts 61 to allow the segments to snap into place an hold one segment in a correct relationship with another segment. The four segments have lengths of 52, 54, 56 and 58 respectively as shown in FIG. 7. There is one blank segment 64 and three normal segments 62,66,68 to make the full length L+L1+L2 as shown in FIG. 3. The cable assembly can be realized by making any combination of segments each having either zero or two interface cables therein. Once again, the individual segments 62,64,66,68 of the segmented bracket 60 can be made using a metallic material such as aluminum or steel, or preferably a EPBM plastic material with a nickel plating.

While a preferred embodiment of the invention has been described using specific terms, such description is for illustrative purposes only, and it is to be understood that changes and variations may be made without departing from the spirit or scope of the following claims.

What is claimed is:

1. An assembly for connecting an internal circuit board of a host computer to a plurality of external peripheral devices, said computer having an enclosure with a plurality of input/output (I/O) ports defined by an input/output (I/O) frame which includes a plurality of spaced apart side posts, an upper rail and a lower rail, said assembly comprising:

a circuit circuit board disposed adjacent one of said I/O ports inside said computer enclosure and having a plurality of terminals;

a plurality of continuous electrical interface cables for transmitting data signals, each of said cables having a first end and a second end;

a plurality of first electrical connectors, one carried by said first end of each of said cables connecting each of said cables to respective ones of said terminals of said circuit board;

a plurality of second electrical connectors, one carried by said second end of each of said cables for connecting said cables to respective ones of said peripheral devices;

a compound bracket for holding and routing said plurality of cables continuously through said one of said I/O ports of said I/O frame;

a bracket mount for attaching said compound bracket to at least an exterior portion of said I/O frame in a closure position closing said one of said I/O ports with said cables passing through said compound bracket for routing to and connecting with said circuit board at said first electrical connectors and with said external peripheral devices at said second electrical connectors;

said compound bracket including a first bracket element having a plurality of first cutouts, a second bracket element having a plurality of second cutouts and a circuit board clip extending into the interior of said enclosure, said circuit board clip engaging with and supporting said circuit board within said computer enclosure;

said first and second cutouts forming a plurality of channel openings extending through said compound bracket in which said electrical cables are mechanically clamped for strain relief and held when said first and second bracket elements are fastened together to route said plurality of cables through said bracket with said compound bracket affixed to said I/O frame; and at least one fastener member carried by at least one of said first and second bracket elements for affixing said first and second bracket elements together with said plurality of cables held within said channel openings to mechanically clamp said electrical cables within said compound bracket.

2. The assembly of claim 1, wherein each of said first and second bracket elements of said compound bracket are generally rigid elements and include an internal bracket section disposed within an interior of said I/O frame and an external bracket section disposed outside of said I/O frame.

3. The assembly set forth in claim 1 wherein said compound bracket comprises:

a plurality of longitudinally arranged rigid bracket segments each having an interlocking arrangement with an adjacent longitudinally arranged bracket segment;

at least one pair of said rigid bracket segments having no openings;

said at least one pair of said rigid bracket segments closing a portion of one of said plurality of said I/O ports of said I/O frame when positioned therein.

4. The assembly set forth in claim 1, wherein said plurality of interface cables each include an unshielded length extending from said first connector to said compound bracket to complete said cable and bracket assembly.

5. The assembly of claim 4, wherein said unshielded length of said cables includes an exterior insulating layer consisting of a shrink tubing applied thereto.

6. The assembly of claim 1 including channel projections extending inwardly within said channel openings to mechanically engage and clamp said cables when said first and second bracket elements are clamped together by said at least one fastener member.

7. The assembly set forth in claim 6, wherein said plurality of interface cables each include a conductive shield layer extending at least from said second electrical connector to a grounding interface of said compound bracket to effectively provide a common ground between the host computer and a respective one of said peripheral devices.

8. The assembly set forth in claim 7, wherein said grounding interface includes:

at least one collar element projecting radially inward into each one of said channel openings;

said collar element having an internal collar diameter reduced in relation to a diameter of said channel opening; and said collar element engaging and gripping at least a portion of said conductive shield layer of a respective one of said cables to ground said conductive shield layer and provide mechanical stress relief for said cable.

9. An assembly for connecting an internal circuit board of a host computer to a plurality of external peripheral devices, said computer having an enclosure with a plurality of ports defined by an input/output (I/O) frame which includes a plurality of spaced apart side posts, an upper rail and a lower rail, said assembly comprising:

a plurality of electrical interface cables each having a first end and a second end;

a plurality of first electrical connectors, one carried by said first end of each of said cables for connecting said cables to said internal circuit board;

a plurality of second electrical connectors, one carried by said second end of each of said cables for connecting said cables to respective ones of said peripheral devices;

a bracket for holding and routing said plurality of cables through a first one of said ports of said I/O frame of said host computer;

a bracket mount for attaching said bracket to said I/O frame in a closure position closing said first one of said ports with said cables passing through said compound bracket for connecting said internal circuit board with said external peripheral devices; and a circuit board clip extending from said bracket inside said enclosure for assisting in holding said internal circuit board in an operational position inside said host computer.

10. The assembly set forth in claim 9, wherein said bracket comprises;

a first bracket element having a plurality of first partial cylindrically shaped cutouts;

a second bracket element having a plurality of second partial cylindrically shaped cutouts; and said first and second partial cylindrically shaped cutouts forming a plurality of cylindrical openings extending through said bracket when said first and second bracket elements are fastened together to hold and route said plurality of cables through said bracket when said bracket is affixed to said I/O frame.

11. An assembly for connecting an internal circuit board of a host computer to a plurality of external peripheral devices, said computer having an enclosure with a plurality of ports defined by an input/output (I/O) frame which includes a plurality of spaced apart side posts, an upper rail and a lower rail, said assembly comprising:

a plurality of electrical interface cables each having a first end and a second end;

a plurality of first electrical connectors, one carried by said first end of each of said cables for connecting said cables to said internal circuit board;

a plurality of second electrical connectors, one carried by said second end of each of said cables for connecting said cables to respective ones of said peripheral devices;

a compound bracket having first and second bracket elements for holding and routing said plurality of cables through a selected one of said ports of said I/O frame of said host computer;

a bracket mount for attaching said compound bracket to said I/O frame in a closure position closing said selected one of said ports with said cables passing through said compound bracket for connecting said internal circuit board with said external peripheral devices; and said second bracket element having a greater thickness than a corresponding thickness of said first bracket element to position said cylindrical openings in a generally offset location relative to a centerline of said selected port, said offset location further positioning said plurality of cables passing through said first port to be generally offset from said internal circuit board; and said first and second bracket elements of said compound bracket include an internal bracket section disposed inside said selected one of said ports and an external bracket section disposed outside said selected one of said ports.

12. The cable assembly set forth in claim 11, wherein said plurality of interface cables each include a metallic shielded length extending from said second electrical connector to a grounding interface of said bracket to effectively provide a common ground between the host computer and a respective one of said peripheral devices.

13. The assembly of claim 11, wherein said thickness of said first bracket element is approximately 55 to 70 percent of said thickness of said second bracket element.

14. An assembly for connecting an internal circuit board of a host computer to a plurality of external peripheral devices, said computer having an enclosure with a plurality of input/output (I/O) ports defined by an input/output (I/O) frame which includes a plurality of spaced apart side posts, an upper rail and a lower rail, said assembly comprising:

a circuit board disposed adjacent one of said I/O ports inside said computer enclosure and having a plurality of terminals;

a plurality of continuous electrical interface cables for transmitting data signals, each of said cables having a first end and a second end;

a plurality of first electrical connectors, one carried by said first end of each of said cables connecting each of said cables to respective ones of said terminals of said circuit board;

a plurality of second electrical connectors, one carried by said second end of each of said cables for connecting said cables to respective ones of said peripheral devices;

a compound bracket for holding and routing said plurality of cables continuously through said one of said I/O ports of said I/O frame;

a bracket mount for attaching said compound bracket to at least an exterior portion of said I/O frame in a closure position closing said one of said I/O ports with said cables passing through said compound bracket for routing to and connecting with said circuit board at said first electrical connectors and with said external peripheral devices at said second electrical connectors;

said compound bracket including a first bracket element having a plurality of first cutouts and a second bracket element having a plurality of second cutouts, said second bracket element having a greater thickness than a corresponding thickness of said first bracket element to position said cylindrical openings in an offset location relative to a centerline of said one of said I/O ports;

said first and second cutouts forming a plurality of channel openings extending through said compound bracket in which said electrical cables are mechanically clamped for strain relief and held when said first and second bracket elements are fastened together to route said plurality of cables through said bracket with said compound bracket affixed to said I/O frame; and at least one fastener member carried by at least one of said first and second bracket elements for affixing said first and second bracket elements together with said plurality of cables held within said channel openings to mechanically clamp said electrical cables within said compound bracket.

\* \* \* \* \*